United States Patent [19]
Murway

[11] Patent Number: 5,253,482
[45] Date of Patent: Oct. 19, 1993

[54] HEAT PUMP CONTROL SYSTEM

[76] Inventor: Edi Murway, 7741 Alabama Ave. - #8, Canoga Park, Calif. 91304

[21] Appl. No.: 904,683

[22] Filed: Jun. 26, 1992

[51] Int. Cl.$^5$ .............................. F25B 7/00
[52] U.S. Cl. ............................ 62/175; 62/199
[58] Field of Search .......... 62/175, 160, 199, 216; 237/2 B

[56] References Cited

U.S. PATENT DOCUMENTS

| | | | |
|---|---|---|---|
| 2,332,981 | 10/1943 | Anderson | 62/225 X |
| 4,596,123 | 6/1986 | Cooperman | 62/199 |
| 5,035,119 | 7/1991 | Alsenz | 62/175 X |

FOREIGN PATENT DOCUMENTS 0196462  8/1989  Japan ........................... 62/199

Primary Examiner—William E. Wayner
Attorney, Agent, or Firm—Gilbert Kivenson

[57] ABSTRACT

An evaporative heat pump apparatus which utilizes a computer and a pulse width modulation control system, solenoid valves and multiple evaporators to alter heat input capabilities by increments in order to maintain a constant rate of heat output regardless of changes in ambient conditions such as temperature, humidity, wind velocity and other factors is described.

3 Claims, 4 Drawing Sheets

HEAT PUMP CONTROL SYSTEM

INTRODUCTION

The present invention relates to a system for the efficient operation of a heat pump. This type of apparatus, which is based on a refrigeration cycle, takes up heat from a large source by the evaporation of a refrigerant at a relatively low temperature, adds heat to the vapor in the form of compressional energy, then cools the vapor back to its original liquid state. The coolant, air or water, is used as the final heat source. The cycle is continuous. Because the original heat source is virtually without limit and of low cost, the heat pump has attracted considerable interest as an efficient method for the heating of space and for the production of hot water.

One difficulty encountered with heat pumps is caused by wide ambient enthalpy variations. This makes it very difficult to properly size the evaporating part of the apparatus. In a typical application, for example, a finned coil or flat plate evaporator is mounted on an outside wall near the structure to be heated. The liquid in the evaporator (which can be a refrigerant such as R-12 or R-22) vaporizes and causes the transfer of heat from the outside air. The transfer temperature may vary from 95 degrees F on a hot summer day to below zero in mid winter: there are also large day to day humidity changes. The amount of refrigerant evaporated and appearing on the suction side of the compressor thus fluctuates widely and is a function of the source enthalpy. For winter operation, a relatively large evaporator is needed. As the outside enthalpy increases, the evaporator area must be decreased to establish equilibrium and maintain efficient operation.

These difficulties have long been recognized by those skilled in the art; many attempts have been made to alleviate them. The most successful of these have provided several evaporators which can be added or removed from the system as ambient conditions fluctuate. The most practical of the systems in the prior art is that of Cooperman (U.S. Pat. No. 4,596,123) which employs three or more separate evaporators in a parallel arrangement with the flow to each being interruptable by solenoid-operated valves. The system "judges" its requirements by monitoring inlet pressure to the compressor. When the suction pressure rises to the first of several set points, this indicates that the outside enthalpy is increasing and soon equilibrium conditions will be lost. A first solenoid valve is deenergized which then shuts off one of the evaporators and reduces the amount of vapor being condensed. With continued rise in outside enthalpy, the other evaporators are successively cut off until only one remains. The system continues to supply heat even when heat source conditions reach summer levels, a desirable feature for hot water and swimming pool heating.

When enthalpy begins to drop, the above-described process is reversed and the system adds evaporators. The increased evaporation area thus permits the compressor to supply a constant number of BTUs to the heat sink (the dwelling, swimming pool, hot water tank, etc.). Although the Cooperman concept is valid and has been experimentally verified, the parameter used in establishing control, the suction pressure, provides a noisy signal in that the addition or subtraction of an evaporator generates a spike which upsets equilibrium control conditions and leads to unwanted oscillation.

Cooperman also proposes the monitoring of the wattage to the compressor motor as the basis for initiating the adding or removing of evaporators. The wattage is a noisy signal and cannot be relied upon to resolve small changes in heat pump performance. Cooperman attempts to smooth the performance of his system by using geometrically sized evaporators.

The present invention, by employing computer controls and relatively small evaporators, permits precise adjustment to changes and significantly more efficient operation.

It is an objective of the present invention to improve the prior art by utilizing a form of artificial intelligence implemented in the form of software executed by a computer.

It is a second objective of the present invention to maintain system operation at a precisely-set saturation pressure and temperature of the refrigerant, and thus approach theoretical efficiency.

It is a third objective of the present invention to have the computer monitor the amount of refrigerant in the system allowing the computer to identify leaks, trigger an alarm and control the charging of the system if desired.

SUMMARY OF THE INVENTION

The present invention incorporates a system which controls the rate of refrigerant addition to one or more evaporators of a heat pump, and compensates for the change in ambient conditions (atmospheric temperature, humidity, wind chill, etc.) and increase$ or reduces the number of evaporators in use. An important feature of the invention is the application of computer technology which accurately controls refrigerant boil off rate in proportion to the deviation from the vapor pressure curve of the refrigerant used. This feature makes possible more efficient heat transfer and uses relatively inexpensive components such as solenoid valves and integrated circuit chips.

When the heat pump of the present invention is first turned on, its compressor starts and one or more of the evaporators come into operation. When the refrigerant vapor nears a previous selected point on the vapor pressure curve, the valves are modulated so as to quickly bring each active evaporator into equilibrium and thus produce saturated vapor.

Should the ambient conditions at the evaporators change because of source variations, the control system modulates and shuts off or adds evaporators to meet the basic system requirement : a constant rate of heat delivery to the load.

It is well known to the art that the use of saturated refrigerant vapor (i.e. vapor which contains no liquid or superheat) makes for the most efficient refrigeration or heat pump cycle and will be the most economical to operate.

DETAILED DESCRIPTION OF THE INVENTION

Figure 1:
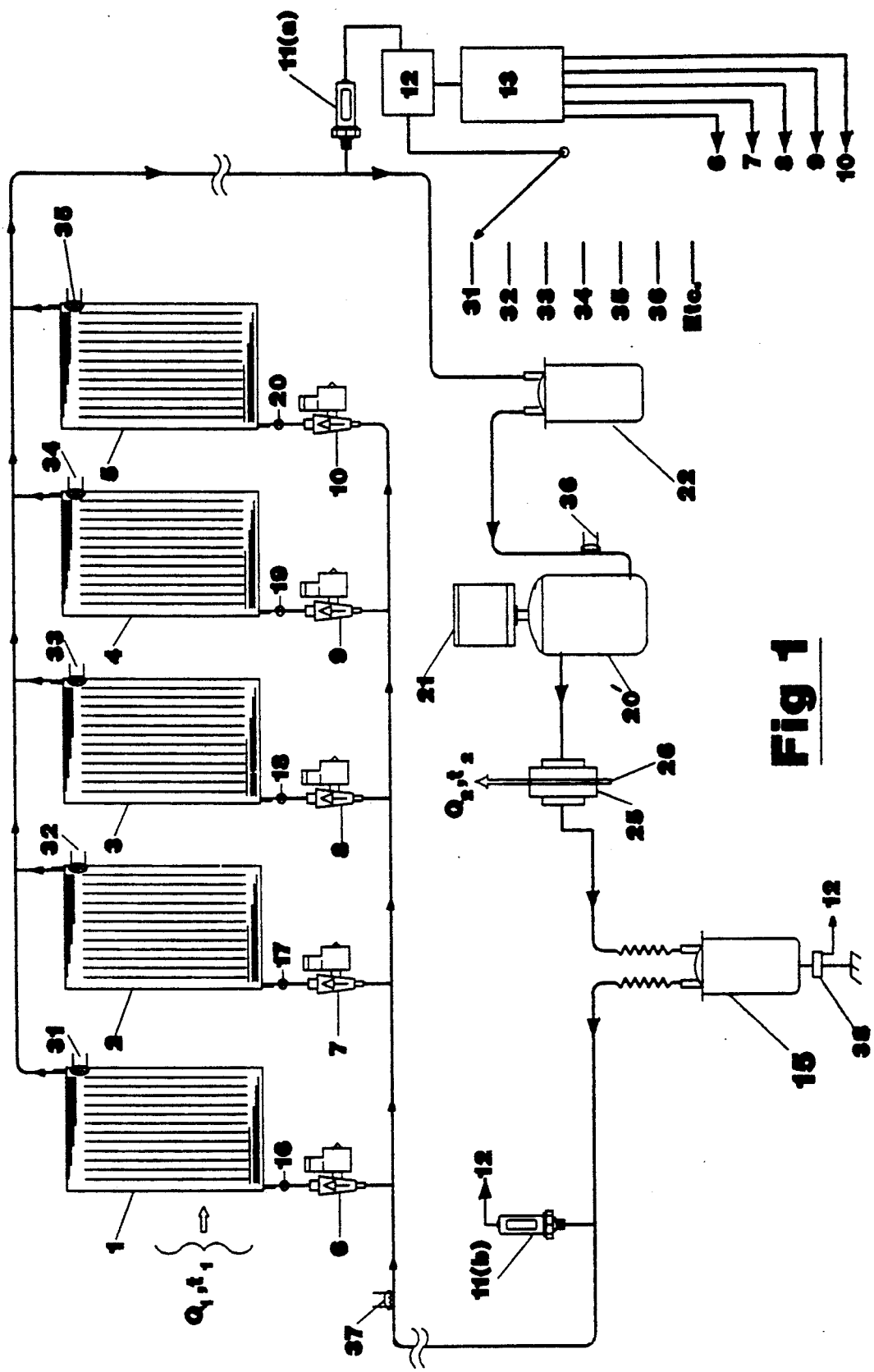
FIG. 1 is a schematic diagram of a preferred embodiment of the invention. The figure shows a number of evaporators which can be connected in parallel across a compressor and condensing system.
Figure 2:
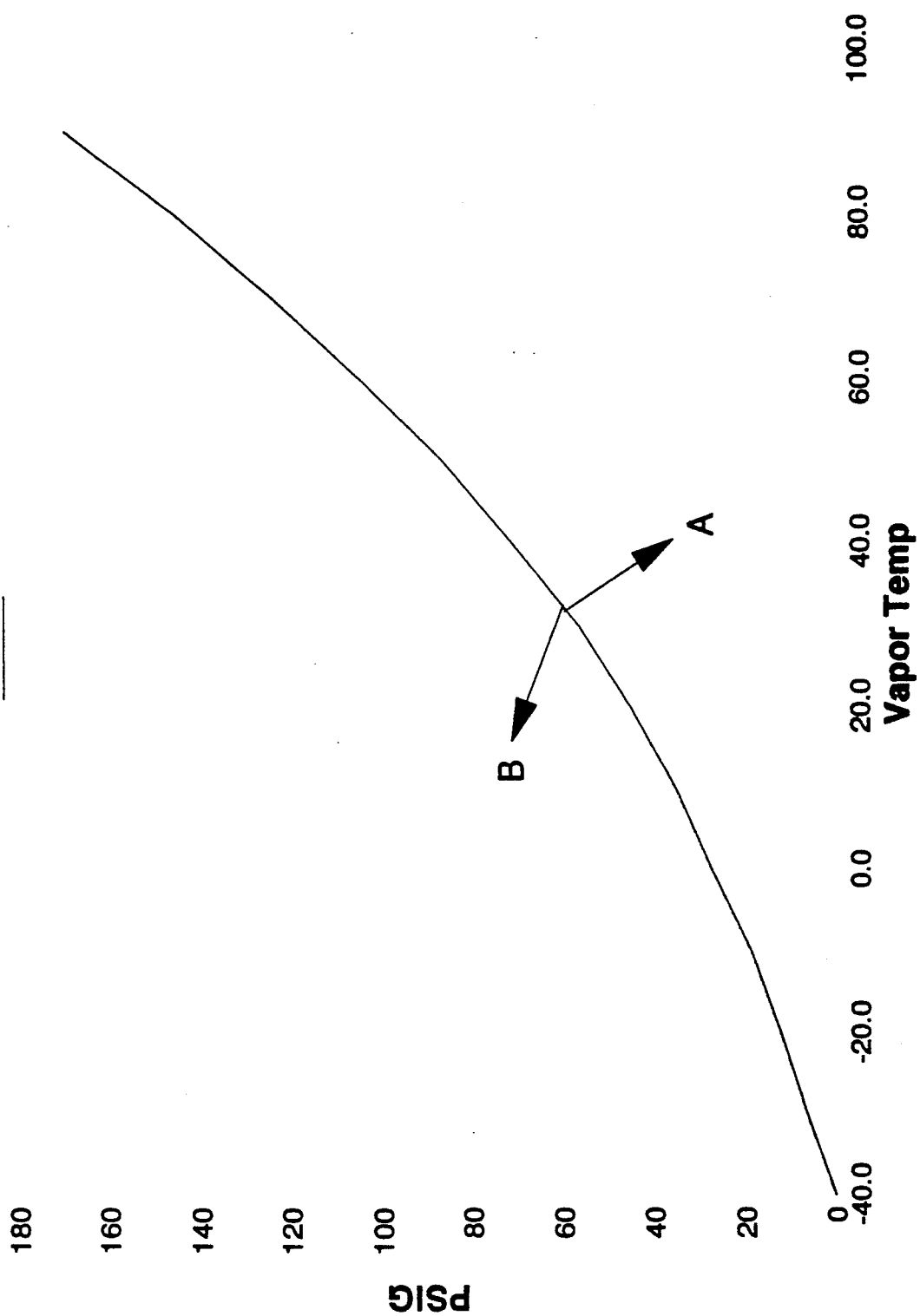
FIG. 2 is a graph of the vapor pressure of a typical refrigerant as a function of temperature.

The invention will be explained with reference to FIGS. 1-4. FIG. 1 illustrates a preferred embodiment.

The overall heat pump loop is made up of a circulating system driven by compressor 20' which is powered by motor 21 as shown in FIG. 1. A refrigerant compound such as R-12 or R-22 circulates through a condenser 25, receiver 15, solenoid valves 6-10, orifices 16-20, evaporators 1-5, an accumulator 22, then back to the compressor. The liquid refrigerant passing through orifices 16-20, is vaporized and expands through the evaporators. This requires a quantity of heat Q1 which is available at an outside temperature t1. The now-vaporized refrigerant passes through accumulator 22 and then enters the suction side of compressor 20'. The vapor is next recompressed and fed to the heat exchanger 25 where the initially acquired heat Q1 plus the work of compression is removed by the coolant fluid 26 as Q2 at an elevated temperature t2. The compressed vapor is then condensed so that liquid refrigerant is now ready to re-enter the evaporator. The purpose of the heat pump is thus accomplished; energy from an outside source at a relatively low temperature is combined with compressional energy and discharged into a designated sink as heat at a higher temperature. This much of the heat pump operation is well known to the prior art.

The present invention embodies a number of improvements which contribute to much higher operating efficiency.

Temperature transducers 31-36 monitor the vapor stream leaving each evaporator and entering the suction side of the compressor. The signals from these devices enter the digital- to- analog converter 12 and a pulse width modulator which is part of computer 13. The output of the pulse width modulator operates the coils of the solenoid valves 6-10. The amount of time that any valve remains open per cycle is determined by that valve's computer-processed driving signal which is based on the difference between the operating point chosen on the vapor pressure curve and the indications of the pressure transducers 11(a) and 11(b) and the outputs of the temperature transducers 31-36. If, for example, one of the temperature indications is above the desired operating point on the vapor pressure curve, the solenoid valve for that evaporator remains open longer to permit a higher rate of evaporation. In the present state of the art the application of a pulse width modulating system as employed in the control devices in computer 13 is relatively inexpensive because of the availability of low cost chip technology. The pressure of the expanding vapor, which is essentially equal to the suction pressure of the compressor 20', is monitored by the pressure transducers 11. Stored in the memory of computer 13 is a vapor pressure curve such as that shown in FIG. 2. If the pressure sensor at 11 reads 60 pounds per square inch gauge, for example, the temperature indicated at each of the transducers 31-35 must be 33 degrees F. Any deviation such as A in FIG. 2 which indicates superheating or B which produces "wet" vapor, causes computer 13 to alter individual modulation ratios of solenoid valves 6-10 to bring the vapor back to its saturated condition. In addition transducers 36 and also compared to the vapor pressure curve-allow computer 13 to compensate for superheat gained on the way back to the compressor 20'. It is well known in the art that maximum efficiency of a heat pump cycle is obtained with the vapor being saturated prior to compression. The compression of superheated vapor, for example, requires greater compressor power than is the case with saturated vapor, the extra power being wasted when the vapor is condensed. Compression of "wet" vapor is also wasteful. Expansion is accomplished by the fixed orifices 16-20. This keeps solenoids 6-10 from freezing and helps to meter refrigerant more accurately.

Although FIG. 1 shows five evaporators, it will be understood that any size and number of evaporators can be accommodated to provide for any desired range of source conditions. The evaporators may be of the flat plate, roll-bonded type or any other type suitable for the application of a heat pump system. The computer control elements of the invention are all provided with proportional, integrating and differentiating (PID) features as is known to the art, which permit close adherence of the system to the refrigerant's vapor pressure curve and close control of the rate of heat input to the compressor within close limits regardless of changes in ambient conditions.

Another feature of the invention is an automatic weighing system which allows the computer to measure the amount of refrigerant in the system. By closing valves 6 through 10 all of the refrigerant in the system is pumped into a container 15 and a weight-sensitive transducer 38 is read by the computer and compared with earlier readings. The ability to measure how much refrigerant is present allows the computer to control the charging of the system automatically.

Figure 3:
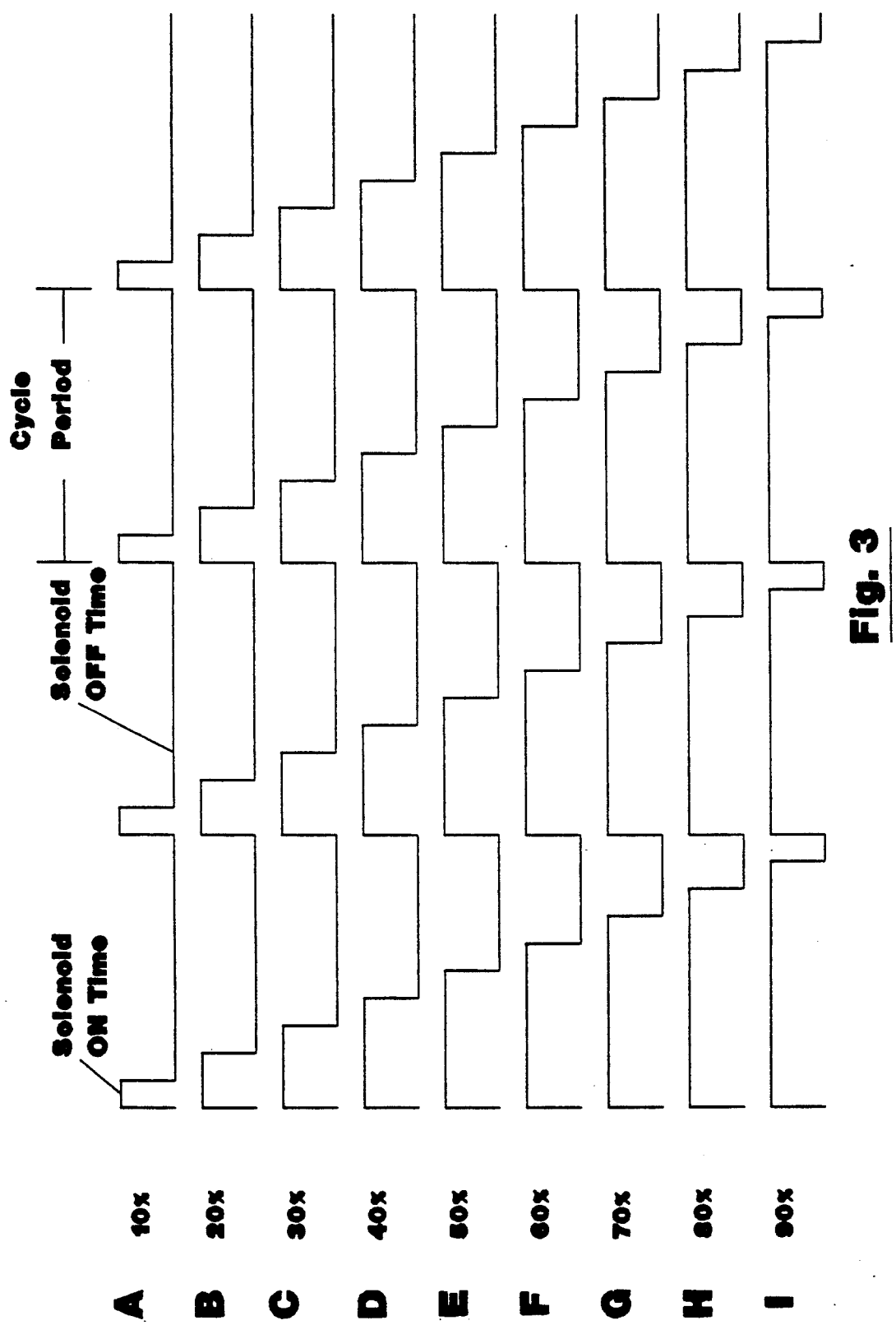
FIG. 3 is an on/off diagram of a single solenoid valve's operation showing the pulse width modulation principal used.

FIG. 3 shows schematically the evaporator modulation method employed in the present invention. The table indicates the amount of time per cycle during which an active evaporator solenoid valve is open. For example in 3(A) valve 6 is open for 10% of the cycle time, then closes. If the cycle time chosen is 1 seconds, valve 6 remains open for 0.1 seconds and closed for 0.9 seconds.

The computer provides for millisecond timing or better. Valves 7-10 remain closed in this example. In 3(B) to 3(I) the amount of open time is increased as needed until valve 6 remains open over 90% of its cycle. It is assumed that the orifices have been sized to accommodate the highest source enthalpy. All active evaporators use this method of modulation.

Computer 13 performs equation of state calculations from data supplied by transducers 11(a),11(b),31-37 and determines the number of BTU/hr that the heat pump is currently producing. If conditions require it, one or more evaporators are added or subtracted to maintain constant heat input to the load.

The use of relatively small evaporators in this invention will increase resolution and decrease response time. The area and type of the evaporators to be used are chosen to balance cost verses resolution and to optimize various other aspects of the application. The solenoid valve on/off cycle can be very precise so that flow regulation accuracy and resolution are also high. The use of fixed orifices 16-20 (FIG. 1) for expansion of the liquefied refrigerant permits the solenoid valves to be sized so that they handle only liquid. Previous attempts in the prior art to modulate flow with expansion valves have resulted in poor regulation and reaction to rapid changes in heat source conditions.

The heat transferred to the load per unit time can be expressed by Fourier's Law:

$$Q1 = UA \Delta t \tag{1}$$

Where Q1=heat per unit time from surroundings to evaporators
U=overall heat transfer coefficient
$\Delta$ t=temperature differential
t1,t2=outside, inside temperatures (FIG. 1)
$\Delta$ t=t1−tr=t2−tw
tr=temperature of expanded refrigerant
tw=temperature of cooling water
A=evaporator area (variable)

Now if Q2 is the heat provided to the cooling water or load, it can be shown that Q2 is linearly related to Q1 by the constant C1:

$$Q2 = C1\, Q1 \tag{2}$$

For maximum efficiency of operation, it is desired that the heat pump output Q2 remain at a constant value C2. For a first approximation it can be assumed that the overall heat transfer coefficient does not change and that U=C3.

Substituting these constants into equation (1) gives $$Q/C1 = C3\, A\Delta t \text{ or} \tag{3}$$

$$C4 = A\Delta t \tag{4}$$

where C4=C2/C1C3

Figure 4:
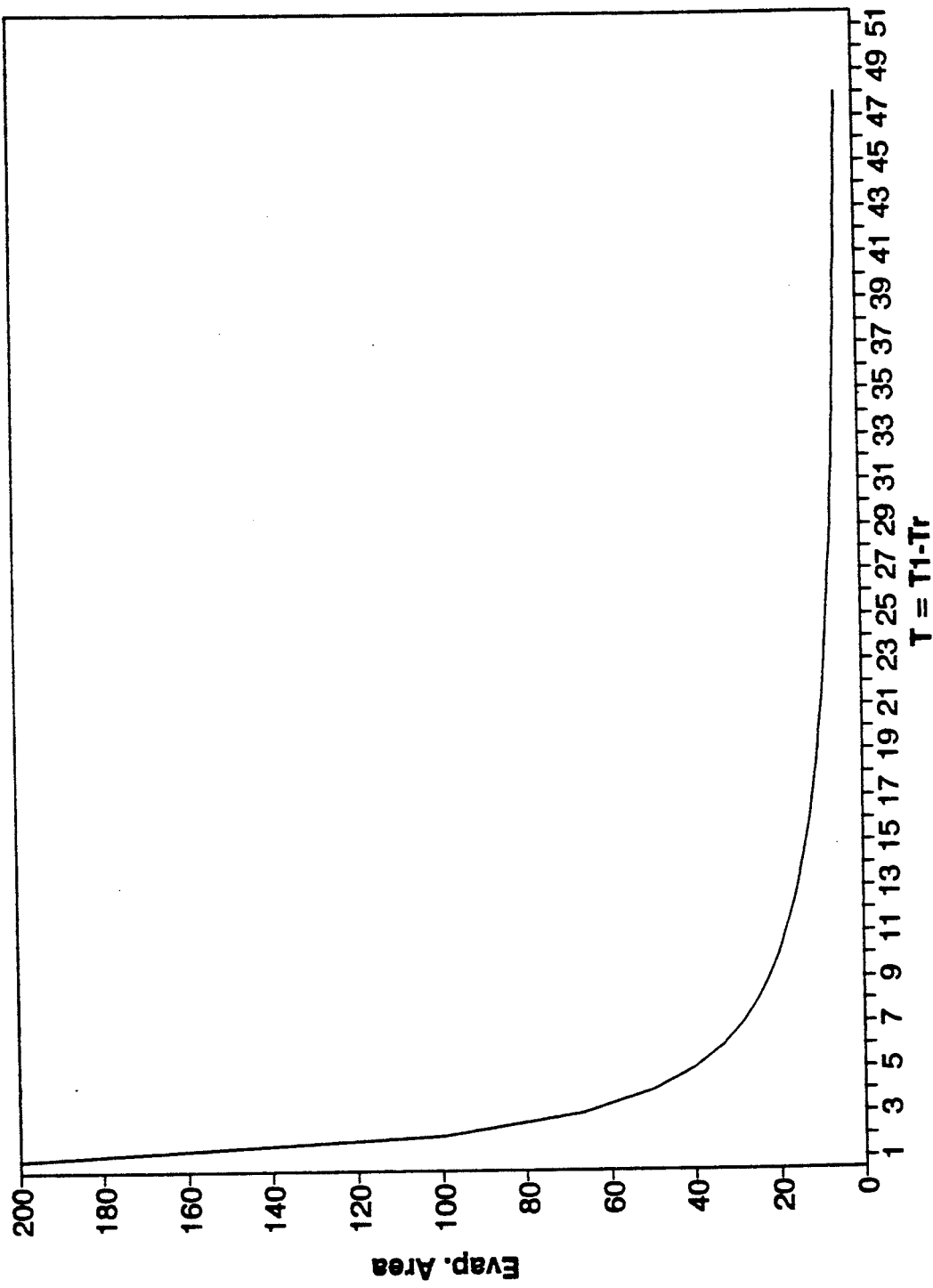
FIG. 4 shows how the required evaporator area varies as a function of the temperature differential between ambient temperature and saturated temperature of the refrigerant.

When equation (4) is plotted it is seen to be a hyperbola (FIG. 4). With increase of $\Delta$ t (increased refrigerant temperature or decreased water temperature) the required evaporation area drops sharply. Conversely, a decrease in $\Delta$ t requires a sharp increase in evaporator area. Compensation of this non-linearity in the prior art by the use of geometrically increasing areas in the evaporators is only approximate. In the control scheme of the present invention the effective evaporator area is regulated in small increments. It is thus possible to achieve close regulation at all desired temperature differential values anywhere on the curve of FIG. 4.

I claim:

1. A heat pump assembly of improved efficiency which utilizes the the evaporation of a refrigerant to absorb heat at a lower temperature and the recompression and liquefying of the refrigerant to provide heat at higher temperature comprising:
    a. a continuous circulating system for the refrigerant;
    b. a number of evaporators connected in parallel and controlled by individual modulating valves;
    c. means for controlling the total amount of refrigerant evaporating into each evaporator according to pressure and temperature sensing devices in the refrigerant vapor in order to maintain said vapor in saturated equilibrium;
    d. compressing mean for the expanded vapor produced by refrigerant evaporation;
    e. heat exchanging mean for cooling and liquefying the refrigerant vapor, said exchanging means serving also to recover heat from the system;
    f. computing means for maintaining heat recovery at a constant amount even when temperatures around the evaporators change by varying the number of evaporators open to refrigerant flow as a function of indications provided by said pressure and temperature sensing devices
    g. and weighing means in the liquified refrigerant line to permit estimation of system leakage at all times, to signal if refrigerant is low and to aid in accurate filling of the system.

2. A heat pump assembly as described in claim 1 in which the number of evaporators in the heat pump cycle are controlled by individual shut off valves each operable by said computing means.

3. A heat pump assembly as described in claim 1 in which said weighing means is a flexibly mounted container in the liquified refrigerant line so connected that variations in refrigerant will cause variations in the vertical position of the container which are registered as weight changes and can be used to signal if sufficient leakage has occurred to require attention.

* * * * *